(12) United States Patent
Chandran et al.

(10) Patent No.: US 11,127,159 B2
(45) Date of Patent: Sep. 21, 2021

(54) SYSTEMS AND METHODS FOR ADAPTIVE LIGHTING FOR DATA-DRIVEN NON-LINE-OF-SIGHT THREE-DIMENSIONAL CAPABILITIES

(71) Applicants: Sreenithy Chandran, Tempe, AZ (US); Suren Jayasuriya, Tempe, AZ (US)

(72) Inventors: Sreenithy Chandran, Tempe, AZ (US); Suren Jayasuriya, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 58 days.

(21) Appl. No.: 16/737,374

(22) Filed: Jan. 8, 2020

(65) Prior Publication Data

US 2020/0226783 A1 Jul. 16, 2020

Related U.S. Application Data

(60) Provisional application No. 62/792,468, filed on Jan. 15, 2019.

(51) Int. Cl.
*G06T 7/73* (2017.01)
*G06N 3/08* (2006.01)

(52) U.S. Cl.
CPC .......... *G06T 7/74* (2017.01); *G06N 3/08* (2013.01); *G06T 2207/10152* (2013.01); *G06T 2207/20084* (2013.01)

(58) Field of Classification Search
CPC combination set(s) only.
See application file for complete search history.

(56) References Cited

U.S. PATENT DOCUMENTS

2013/0100250 A1* 4/2013 Raskar .................. G01S 7/4808
   348/46
2015/0301592 A1* 10/2015 Miller .................... G06F 3/012
   345/156

OTHER PUBLICATIONS

Christos Thrampoulidi,"Exploiting Occlusion in Non-Line-of-Sight Active Imaging", IEEE Transactions on Computational Imaging, vol. 4, No. 3, Sep. 2018, pp. 419-427.*
Michael F. Cohen."The Hehi-Cube a Radiosity Solution for Complex Environments", San Francisco Jul. 22-26—vol. 19, No. 3, 1985, pp. 31-37.*
Chia-Yin Tsai,"The Geometry of First-Returning Photons for Non-Line-of-Sight Imaging", Proceedings of the IEEE Conference on Computer Vision and Pattern Recognition (CVPR), 2017, pp. 7216-7224.*
Velten, et al., Recovering three-dimensional shape around a corner using ultrafast time-of-flight imaging. Nature Communications, 3:745, 2012.
Wang, et al., Programmable triangulation light curtains. In European Conference on Computer Vision, pp. 20-35. Springer, 2018.
Xin, et al., A theory of fermat paths for non-line-of-sight shape reconstruction. In Proceedings of the IEEE Conference on Computer Vision and Pattern Recognition, pp. 6800-6809, 2019.

(Continued)

*Primary Examiner* — Omar S Ismail
(74) *Attorney, Agent, or Firm* — Polsinelli PC (57) ABSTRACT

Various embodiments for system and method of adaptive lighting for data-driven non-line-of-sight imaging are disclosed.

18 Claims, 8 Drawing Sheets
(6 of 8 Drawing Sheet(s) Filed in Color)

(56) References Cited

OTHER PUBLICATIONS

Zhang, et al., Physically-based rendering for indoor scene understanding using convolutional neural networks. The IEEE Conference on Computer Vision and Pattern Recognition (CVPR), 2017.
U.S. Appl. No. 16/901,961, filed Jun. 15, 2020, Jayasuriya et al.
Michael F Cohen and John R Wallace. Radiosity and realistic image synthesis. Elsevier, 2012.
Achar, et al., Epipolar time-of-flight imaging. ACM Transactions on Graphics, 36(4):37, 2017.
Arellano, et al., Fast back-projection for non-line of sight reconstruction. Optics Express, 25(10):11574-11583, 2017.
Baradad, et al., Inferring light fields from shadows. In Proceedings of the IEEE Conference on Computer Vision and Pattern Recognition, pp. 6267-6275, 2018.
Bouman, et al., Turning corners into cameras: Principles and methods. In 2017 IEEE International Conference on Computer Vision (ICCV), pp. 2289-2297. IEEE, 2017.
Buttafava, et al., Non-line-of-sight imaging using a time-gated single photon avalanche diode. Optics Express, 23(16):20997-21011, 2015.
Caramazza, et al., Neural network identification of people hidden from view with a single-pixel, single-photon detector. Scientific Reports, (8), 2018. ISSN 2045-2322.
Chan, et al., Non-line-of-sight tracking of people at long range. Optics Express, 25(9):10109-10117, 2017.
Chen, et al., Steady-state non-line-of-sight imaging. The IEEE Conference on Computer Vision and Pattern Recognition (CVPR), 2019.
Cohen, et al., The hemi-cube: A radiosity solution for complex environments. In ACM SIGGRAPH Computer Graphics, vol. 19, pp. 31-40. ACM, 1985.
Cova, et al., Avalanche photodiodes and quenching circuits for single-photon detection. Applied Optics, 35(12):1956-1976, Apr. 1996.
Deng, et al., Imagenet: A large-scale hierarchical image database. In Computer Vision and Pattern Recognition, 2009. CVPR 2009. IEEE Conference, pp. 248-255. IEEE 2009.
Gariepy, et al., Detection and tracking of moving objects hidden from view. Nature Photonics, 10(1):23-26, 2016.
Goral, et al., Modeling the interaction of light between diffuse surfaces. In ACM SIGGRAPH Computer Graphics, vol. 18, pp. 213-222. ACM, 1984.
Greff, et al., Lstm: A search space odyssey. IEEE Transactions on Neural Networks.
Gupta, et al., Reconstruction of hidden 3d shapes using diffuse reflections Optics Express, 20(17):19096-19108, 2012.
He, et al., Deep residual learning for image recognition. Proceedings of the IEEE conference on computer vision and pattern recognition, pp. 770-778. 2016.
Heide, et al., Diffuse mirrors; 3d reconstruction from diffuse indirect illumination using inexpensive time-of-flight sensors. In Proceedings of the IEEE Conference on Computer Vision and Pattern Recognition, pp. 3222-3229, 2014.
Heide, et al., Non-line-of-sight imaging with partial occluders and surface normals. ACM Transactions on Graphics, 38, 2019.
Heide, et al., Robust non-line-of-sight imaging with single photon detectors. arXiv preprint arXiv: 1711.07134, 2017.
Jakob, Mitsuba renderer, 2010. http://www.mitsuba-renderer.org.
Jones, et al., SciPy: Open source scientific tools for Python, 2001. URL http://www.scipy.org/. [Online; accessed Apr. 29, 2019].
Kadambi, et al., Occluded imaging with time-of-flight sensors. ACM Transactions on Graphics, 35(2):15, 2016.
Kajiya, The rendering equation. In ACM Siggraph Computer Graphics, vol. 20, pp. 143-150. ACM, 1986.
Keller, Instant radiosity. In Proceedings of the 24th Annual Conference on Computer Graphics and Interactive Techniques, pp. 49-56. ACM Press/Addison-Wesley Publishing Co., 1997.
Kirmani, et al., Looking around the corner using transient imaging. In Computer Vision, 2009 IEEE 12th International Conference on, pp. 159-166. IEEE, 2009.
Klein, et al., A quantitative platform for non-line-of-sight imaging problems. In British Machine Vision Conference 2018, BMVC 2018, Northumbria University, Newcastle, UK, Sep. 3-6, 2018, p. 104, 2018.
Klein, et al., Tracking objects outside the line of sight using 2d intensity images. Scientific Reports, 6:32491, 2016.
Kubo, et al., Acquiring and characterizing plane-to-ray indirect light transport. In Computational Photography (ICCP), 2018 IEEE International Conference, pp. 1-10. IEEE, 2018.
La Manna, et al., Error back projection algorithms for non-line-of-sight imaging. IEEE Transactions on Pattern Analysis and Machine Intelligence, 2018.
Lindell, et al., Wave-based non-line-of-sight imaging using fast f-k migration. ACM Transactions on Graphics, 38(4):116:1-116:13, Jul. 2019. ISSN 0730-0301.
O'Toole, et al., Confocal non-line-of-sight imaging based on the light-cone transform. Nature, 555(7696):338, 2018.
O'Toole, et al., Homogeneous codes for energy-efficient illumination and imaging. ACM Transactions on Graphics, 34(4):35, 2015.
Pediredla, et al., Reconstructing rooms using photon echoes: A plane based model and reconstruction algorithm for looking around the corner. In 2017 IEEE International Conference on Computational Photography (ICCP). IEEE, 2017.
Pediredla, et al., Snlos: Non-line-of-sight scanning through temporal focusing. In 2019 IEEE International Conference on Computational Photography (ICCP), pp. 1-13, May 2019.
Razavian, et al., Cnn features off-the-shelf: an astounding baseline for recognition. Proceedings of the IEEE conference on computer vision and pattern recognition workshops, pp. 806-813. 2014.
Satat, et al., Object classification through scattering media with deep learning on time resolved measurement. Optics Express, 25(15):17466-17479, 2017.
Sen, et al., Dual photography. ACM Transactions on Graphics, 24 (3):745-755, 2005.
Sermanet, et al., Traffic sign recognition with multi-scale convolutional networks. In International Joint Conference on Neural Networks, pp. 2809-2813, 2011.
Simonyan, et al., Very deep convolutional networks for large-scale image recognition. arXiv preprint arXiv:1409.1556, 2014.
Smith, et al., Tracking multiple objects outside the line of sight using speckle imaging. In Proceedings of the IEEE Conference on Computer Vision and Pattern Recognition, pp. 6258-6266, 2018.
Szegedy, et al., Rethinking the inception architecture for computer vision. Proceedings of the IEEE conference on computer vision and pattern recognition, pp. 2818-2826. 2016.
Tancik, et al., Data-driven non-line-of-sight imaging with a traditional camera. In Imaging Systems and Applications, pages IW2B-6. Optical Society of America, 2018.
Tancik, et al., Flash photography for data-driven hidden scene recovery. arXiv preprint arXiv:1810.11710, 2018.
Thrampo et al., Exploiting occlusion in non-line-of-sight active imaging. IEEE Transactions on Computational Imaging, 2018.
Torralba, et al., Accidental pinhole and pinspeck cameras. International Journal of Computer Vision, 110(2):92-112, 2014.
Tsai, et al., The geometry of first-return in photons for non-line-of-sight imaging. In 2017 IEEE Conference on Computer Vision and Pattern Recognition (CVPR), pp. 2336-2344. IEEE, 2017.
Ueda, et al., Slope disparity gating using a synchronized projector-camera system. In 2019 IEEE International Conference on Computational Photography (ICCP), pp. 1-9. IEEE, 2019.
Veach, Robust monte carlo methods for light transport simulation. No. 1610. Stanford University PhD thesis, 1997.

\* cited by examiner

SYSTEMS AND METHODS FOR ADAPTIVE LIGHTING FOR DATA-DRIVEN NON-LINE-OF-SIGHT THREE-DIMENSIONAL CAPABILITIES

CROSS REFERENCE TO RELATED APPLICATIONS

This is a non-provisional application that claims benefit from U.S. provisional application Ser. No. 62/792,468 filed on Jan. 15, 2019, which is herein incorporated by reference in its entirety.

FIELD

The present disclosure generally relates non-line-of-sight three-dimensional localization; and in particular to systems and methods of adaptive lighting for data-driven non-line-of-sight three-dimensional localization.

BACKGROUND

Non-line-of-sight (NLOS) imaging is an emerging field of research with applications for autonomous vehicle collision avoidance, search and rescue operations, industrial safety and inspection, endoscopy, and others. This problem is challenging because NLOS objects are outside of the line-of-sight (LOS) of both the camera and the illumination source(s). This requires computational algorithms to reconstruct the scene from indirect light paths which travel to the NLOS and back. These light paths are necessarily third-bounce or more, with extremely low signal-to-noise (SNR), and are mixed with other indirect and direct light paths at the sensor.

Recent success in NLOS reconstruction has relied on measurement of the time-of-flight of light to help separate NLOS from LOS path contributions. This includes using pulsed lasers and streak cameras, continuous-wave time-of-flight cameras and single-photon avalanche diodes (SPADs). Using time-resolved measurements, back-propagation and optimization can reconstruct the NLOS scene, typically under the assumption of a flat LOS wall to avoid LOS indirect light. These time-resolved detectors, while achieving superior results are costly and consume higher power than conventional CMOS image sensors, thereby requiring specialized aligned optics and lasers. To alleviate these issues, research has also focused on NLOS imaging using conventional cameras.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Various embodiments for systems and methods of a data-driven approach to the problem of NLOS 3D localization and object identification that leverages modern existing convolutional neural network architectures. This data driven approach requires only a conventional 2D camera and a projector, and no optical alignment or projector-camera synchronization. A dataset of images is collected for various objects of different shape and size for training, and perform ablative studies on the effects of these parameters.

To handle LOS scenes that exhibit diffuse interreflections from non-planar surfaces, an adaptive lighting algorithm based on radiosity that improves learning performance is disclosed herein. The adaptive lighting determines the optimal patches to illuminate in the LOS that maximize NLOS radiosity captured by the camera. Further, a constrained optimization problem is solved to determine the distribution of illumination power per patch given a total system power budget. This is particularly useful for power-constrained applications such as robotics and unmanned aerial vehicles that operate on a finite battery life.

In particular, the specific contributions of the present system are:

NLOS 3D localization and object identification using convolutional neural networks with a conventional camera and projector.
  Robust performance of present system for non-planar LOS geometries including those with diffuse inter-reflection.
  An adaptive lighting algorithm executed by a processor for identifying optimal LOS patches to maximize NLOS radiosity captured, and distribute illumination power among these patches given power constraints.
  Improved NLOS localization using an adaptive lighting algorithm executed by a processor.
  Improved NLOS object identification using an adaptive lighting algorithm executed by a processor.

Radiosity: Radiosity measures the radiative transfer of energy between diffuse emitters and reflectors. Radiosity yields efficient solvers for real-time rendering. In the present disclosure, radiosity and form-factor calculations are utilized to determine which LOS patches, when illuminated, maximize the NLOS information captured.

NLOS Localization and Identification with Deep Learning

Figure 1:
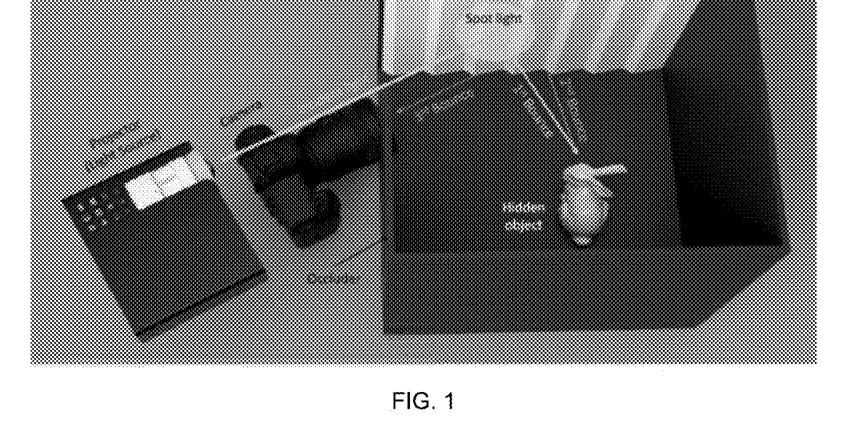
FIG. 1 is an illustration showing a three-bounce-light setup for localizing and identifying an NLOS object.
Figure 2:
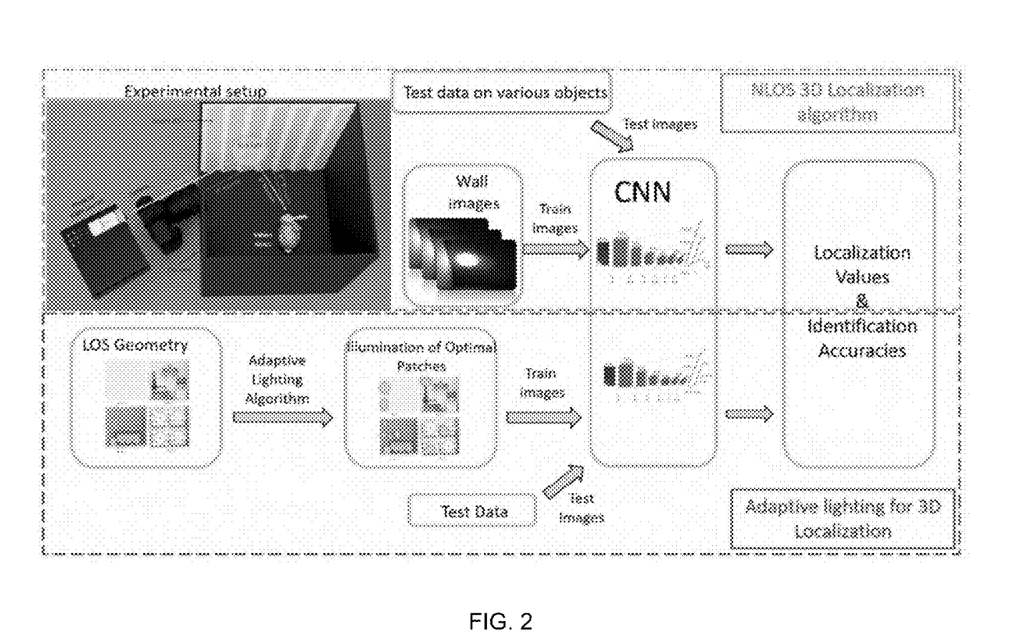
FIG. 2 is an illustration of a system diagram of a training/testing procedure for both NLOS 3D localization using CNNs and for an adaptive lighting algorithm to improve this localization and identification performance.

NLOS imaging scenario is depicted in FIG. 1. A projector illuminates a spot on a LOS wall (not necessarily planar), and a camera captures an image of this spot. An illuminated spot on the wall undergoes at least three diffuse reflections or bounces as it travels from a point on the wall to hidden NLOS object and back to the wall, before being captured by the focused camera.

The NLOS imaging scenario consists of a projector illuminating a spot on a LOS scene (not necessarily planar), and a camera captures an image of this spot. An illuminated spot on the wall undergoes at least three diffuse reflections or bounces as it travels from a point on the wall to hidden NLOS object and back to the wall, before being captured by the focused camera. The tasks of interest include localization, i.e. determining the (x, y, z) location of an object's centroid, and identification of that object is present in the NLOS. In this disclosure, assume a fixed surveillance scenario where information about the line-of-sight (LOS) is known, and images can be captured for training of neural networks. While these assumptions limit the practical application of this research (i.e. does not generalize to unseen locations or moving scenes), it allowed tractability in which to investigate questions about localization, identification, and adaptive lighting.

Localization as voxel classification: NLOS localization is defined as identifying the volume in the occluded NLOS space that contains the hidden object's centroid. The occluded NLOS region is divided into voxels of a certain volume. The present system thus formulates the learning problem as voxel classification: it is predicted which NLOS voxel contains the object's centroid. Each voxel is treated as a separate class, and the object is positioned within each voxel for varying x,y,z values. The voxel size determines the minimum accuracy of the NLOS localization. It is noted that objects can be smaller or larger than one voxel, but the object's centroid necessarily only lies within one voxel.

An alternative formulation would be to regress to the three-dimensional coordinates of an object's centroid directly. However, it is more difficult to determine the network's confidence in these regressions as opposed to the confidence due to voxel classification given by a softmax layer. Further, errors in regression are not interpretable, while errors in classification can be analyzed with respect to voxel size as shown later in the experimental results. However, experiments were conducted with direct regression in the network architecture, please see the supplementary material.

Data Rendering

For synthetic data generation, the present system uses the physically-based renderer Mitsuba. The present system renders scenes similar to those shown in FIG. 1, and used two types of NLOS objects: a sphere and the Stanford bunny with different sizes. The illuminated spot was randomly positioned on the LOS wall. For the adaptive lightings described later herein, the present system positions the spot(s) to illuminate the patch(es) given by the optimization algorithm.

To quickly model image formation, the present system uses the Instant Radiosity algorithm available in Mitsuba. This does not generate physically-realistic images as compared to using Monte Carlo integration for solving the rendering equation, but it enables extremely fast rendering speeds. Rendering one image of 300×300 resolution with 20,000 samples per pixel (spp) takes 18 seconds on a GeForce GTX1080 Ti GPU. This enabled dataset creation up to 19,000 images suitable for deep learning in a short amount of time, while rendering a full Monte Carlo path tracer at 20,000 spp takes 22 minutes per image. Previous work has shown that physically-realistic rendering using Monte Carlo compared to radiosity does lead to improved performance for computer vision tasks. However, the present system achieves high accuracy ≥90%) using radiosity images. It is left to future work to show NLOS scenes where physically-realistic rendering is critical for learning performance.

Network Architectures

Figure 3:
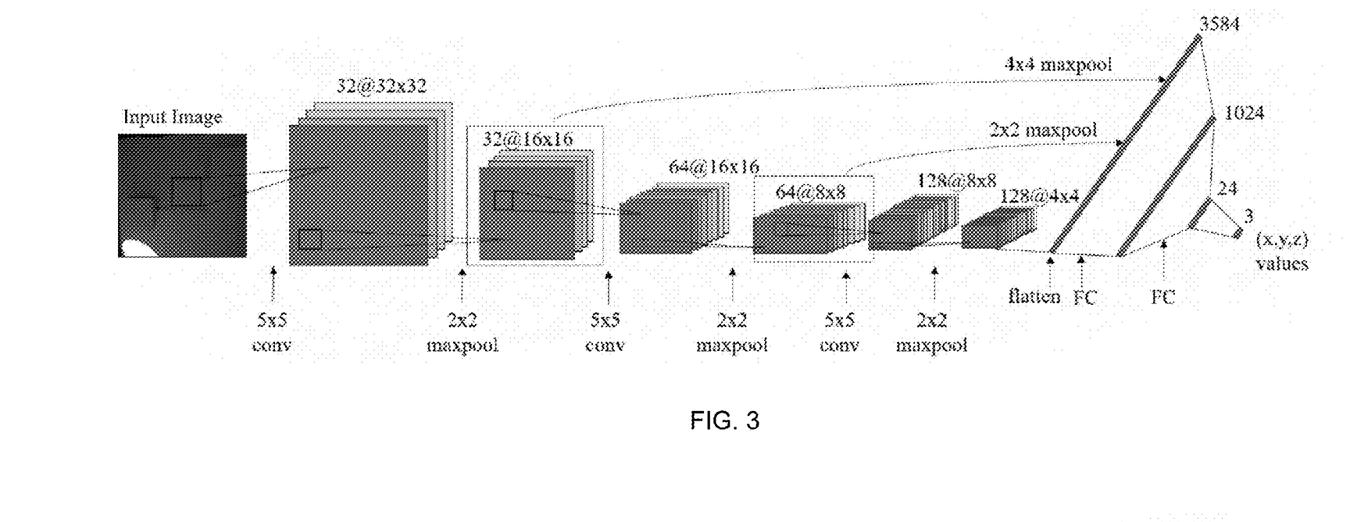
FIG. 3 is a graphical representation of a CNN architecture for NLOS object localization.
Figure 4:
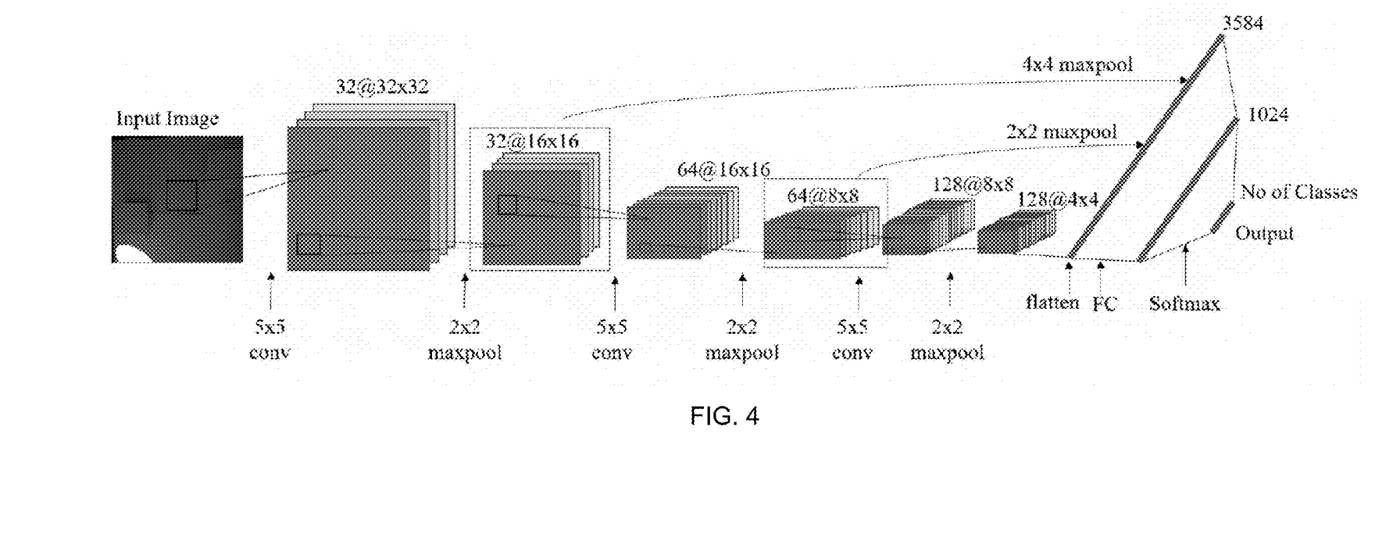
FIG. 4 is a graphical representation of a CNN architecture for NLOS object identification.

The present network architectures are similar for localization and identification with a few changes to the last layers. The network architecture consists of five layers: three convolutional layers for feature extraction and either two fully connected layers for localization, or a fully connected layer and soft-max classifier for object identification. Multi-scale features are used via skip connections. Convolution layers are of size 5×5 with a stride of 1. Pooling layers are of size 2×2. A ReLU is performed after each pooling layer and before each fully connected layer. The localization network has three outputs corresponding to the predicted (x, y, z) centroid location. The identification network uses softmax for classification into object classes. Each network is trained with images with multiple NLOS objects but only one type of LOS scene/wall. The network architecture for localization is in FIG. 3; FIG. 4 shows a similar network architecture for identification. Note that neither background subtraction nor calibration are performed with knowledge that there is no NLOS object in the scene for the images at testing/inference as compared to other works Adaptive Lighting for Improved NLOS Localization A central question explored in the present disclosure is what are the best lighting patterns in the LOS which maximize NLOS localization and identification? In other words, given a LOS scene with N patches, what patches maximize photons that travel along NLOS light paths? This will help increase SNR for the NLOS information captured at the camera. In particular, the present disclosure generalizes from LOS scenes that are planar walls to LOS walls with local convex and concave features, non-planar geometries, and diffuse interreflections. This is a first step to having NLOS imaging work for complex LOS scenes in the real world.

To approach this problem, the present system uses physics-based constraints on light transport given by radiosity. Radiosity describes the transfer of radiant energy between surfaces in the scene, and is calculated based on surface geometry and reflectances/emittances. The present system makes the following assumptions: (1) diffuse reflection and emittance only, and (2) only considering third bounce light. Higher order bounce light may also contribute to NLOS image formation, but their relative contribution is much smaller due to light falloff and loss of energy with each reflection bounce.

Radiosity Equation: The total radiosity leaving a single patch will be its emission (i.e. if its a light source) along with the summation of all reflected radiosity from other patches [13]:

$$B_i = E_i + \rho_i \sum_{j=1}^{N} F_{ij} B_j \tag{1}$$

where $B_i$ is the outgoing radiosity of patch i, $E_i$ is the energy emitted out of the patch i, $\rho_i$ is the diffuse reflectance of the patch i, $F_{ij}$ is the form factor (also referred to as "view factor") which determines how much light is transferred from one patch to another, and B is the outgoing radiosity of patch j.

The form factor (or view factor) of two patches i and j is given in the following (approximate) form:

$$F_{ij} = \left(\frac{\cos\theta_i \cos\theta_j}{\pi r^2}\right) V(x_i, x_j) A_i \tag{2}$$

where $x_i$ is the central point on patch i, $x_j$ is a central point on patch j, $r=\|x_i-x_j\|$ is the distance between $x_i$ and $x_j$, $\theta_i$ angle between normal $N_i$ and vector $x_j-x_i$, $\theta_j$ angle between normal $N_j$ and vector $x_i-x_j$, and $V(x_i, x_j)$ is the visibility function of both patches. This visibility function accounts for occlusion, and is 1 if patch i is visible from patch j, and 0 otherwise. For the modeling assumptions, the present system does not consider occlusion in the NLOS. Note that this is an approximation of radiosity, and that radiosity form factors can be better calculated using hemicubes. However, this is a common approximation used in practice for NLOS imaging.

Maximizing NLOS Radiosity

An adaptive lighting optimization algorithm based on radiosity executed by a processor will be discussed in greater detail. Using the above radiosity equation, the system can calculate the radiosity for LOS light paths and NLOS light paths for three bounce light. If it is desired to illuminate only one patch in the LOS, the system attempts to maximize the following:

$$\underset{i \in [1, \ldots, N]}{\operatorname{argmax}} B_i^{NLOS} \tag{3}$$

where $B_i^{NLOS}$ is the NLOS radiosity from patch i. The present system can determine $B_i^{NLOS}$ by summing all three-bounce light paths that hit both the patch i and the NLOS voxel. Here the index i denotes the one optimal patch out of N total possible LOS patches.

To illuminate multiple m patches out of N total LOS patches, the present system maximizes:

$$\underset{[1, \ldots, m] \subseteq [1, \ldots, N]}{\operatorname{argmax}} \sum_{i=1}^{m} B_i^{NLOS} \tag{4}$$

where the top 1, . . . , m patches are chosen which maximize the NLOS radiosity. Note that this is a trivial optimization problem which selects the top $B_i^{NLOS}$ terms.

Distributed Light Algorithm: The real advantage of adaptive lighting is when the imaging system has tight power constraints for its illumination. This is common for embedded and mobile computer vision platforms such as robotics and unmanned aerial vehicles. New energy-efficient active illumination also exploits illuminating and capturing only salient light paths to extract signals of interest. In this vein, the present system includes a distributive algorithm which tells not only what are the optimal patches to shine light, but what fraction of power from the power budget should each patch be shined on.

A joint optimization was formulated over the m optimal patches and the illumination radiant exitances $I_i$, i=1, . . . , M for each patch. This is given by the following equation:

$$\underset{\substack{[1, \ldots, m] \subseteq [1, \ldots, N] \\ I_1, \ldots, I_m}}{\operatorname{argmax}} \sum_{i=1}^{m} B_i^{NLOS}(I_i) \tag{5}$$

such that $\sum_{i=1}^{m} I_i = T, \quad \forall I_i \leq I_o$.

Here, $B_i^{NLOS}(I_i)$ is the radiosity for patch i given illumination radiant exitance $I_i$, T is the total power constraint over all illumination, and each radiant exitance cannot exceed a maximum $I_o$.

Implementation: the full adaptive lighting algorithm is written in Algorithm 1. The present system uses the Sequential Least Squares Programming algorithm available in SciPy library to solve the optimization problem. The full optimization for adaptive lighting takes between 1-2 minutes to run on a conventional CPU.

Radiosity Derivation

Additional material concerning the derivation of the adaptive lighting algorithm based on radiosity, implementation details for the experiments, and a small analysis of visual saliency in the network performance is further disclosed herein.

Adaptive Lighting

Let $S_1, S_2 \ldots S_N$ be the N patches on the reflective LOS wall, light source denoted as p, camera denoted as C and the NLOS patch denoted as NLOS. To calculate the radiosity along a ray for three bounce light, one must first calculate its first and second bounces.

First Bounce (LOS):

$$p \Rightarrow Si \Rightarrow C \ \forall i \in \{1, N\}.$$

When light travels from the source to a diffuse wall and bounces back to the camera, the associated radiosity is given as the product of the reflectance of the surface $\rho_i$, the radiosity of the incident light $B_p$, and the form factor (view factor) $F_{ip}$ between the p and the ith patch, and the visibility term Vi:

$$B_{first} = B_i = \rho_i B_p F_{ip} V_i, \ \forall i \in \{1, N\}. \tag{6}$$

Figure 5:
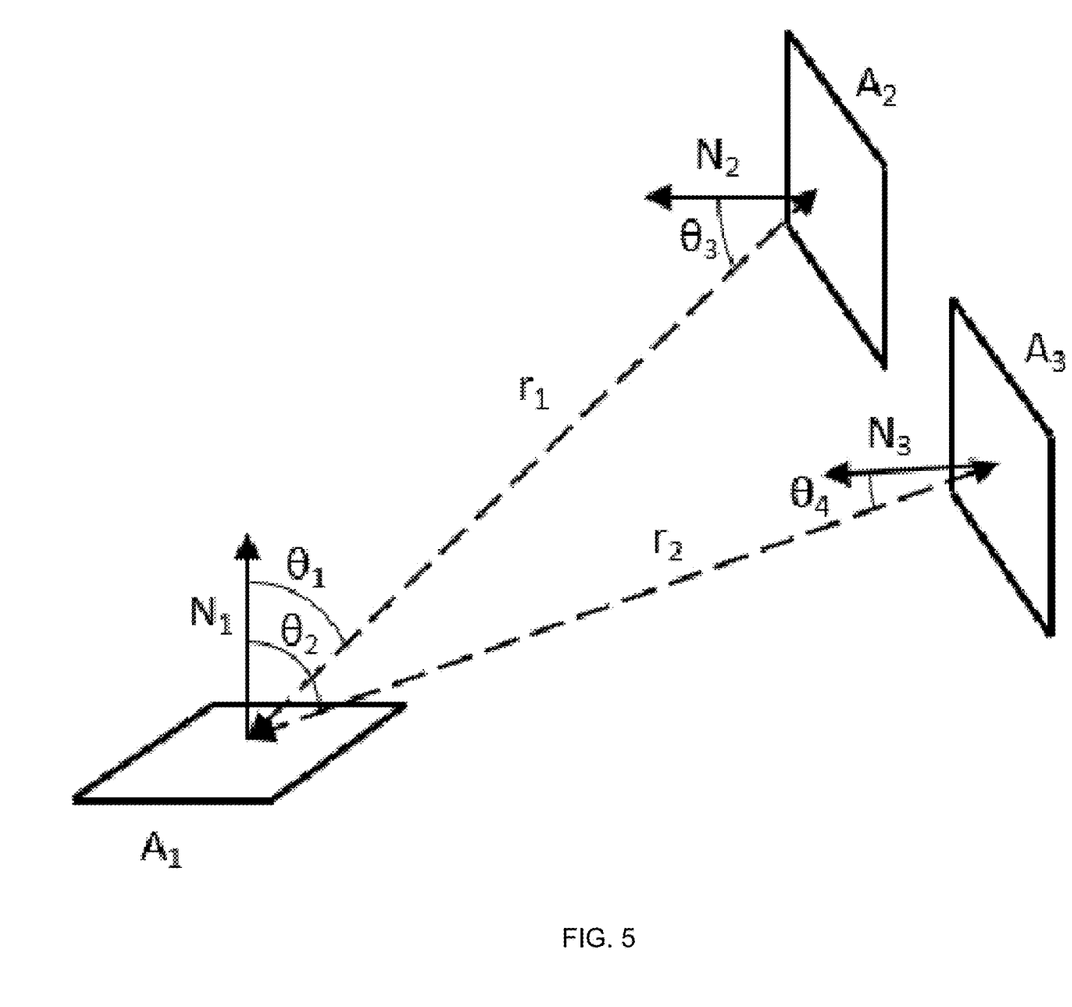
FIG. 5 is an illustration of the transfer of light between diffuse surfaces.
Figure 6A:
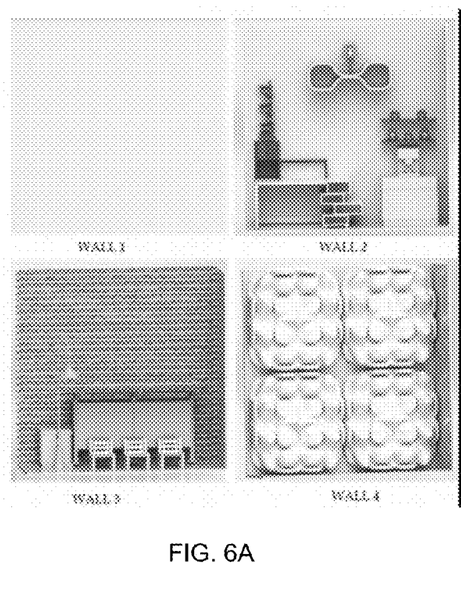
FIGS. 6A and 6B show images of different LOS walls and associated optimal lighting patterns.
Figure 6B:
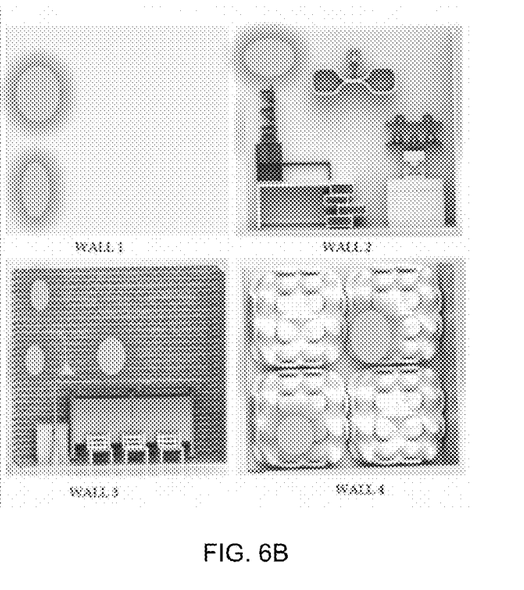
Figure 6C:
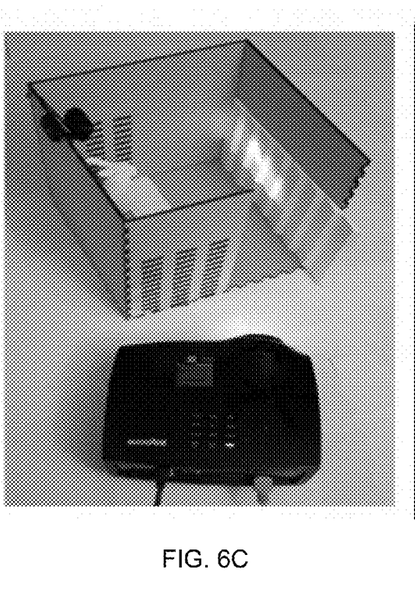
FIG. 6C shows a photograph of an experimental setup featuring a light source, a detector, a wall, and an object.
Figure 6D:
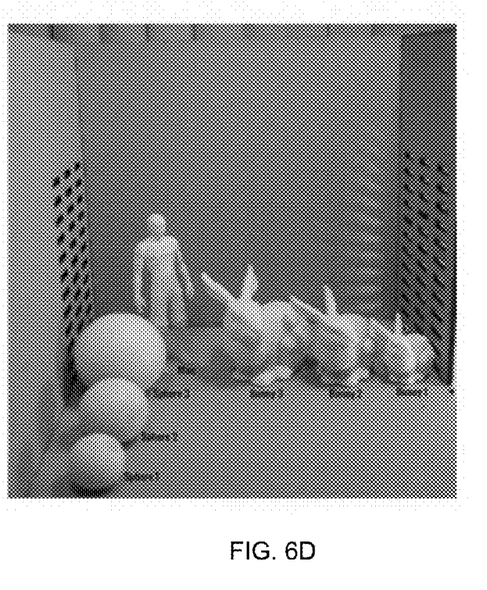
FIG. 6D shows multiple types of objects used during experimentation.

The form factor (view factor) calculates how much light is transferred from one patch to another. Since the wall is divided into N patches, the first bounce radiosity associated with all the N patches is calculated. It takes into account the distance between the surfaces, computed as the distance between the center of each of the surfaces, and their orientation in space relative to each other, computed as the angle between each surface's normal vector and a vector drawn from the center of one surface to the center of the other surface:

$$F_{ij} = \frac{\cos\theta_j \cos\theta_i}{\pi(x_j - x_i)^2} \cdot A_i \tag{7}$$

A visual depiction is shown in FIG. 5. However the above equation does not account for occlusion between the two patches. This is accounted by the visibility term V(i, j):

$$V_i(\vec{X}_a, \vec{X}_b, \vec{N}_a) = \begin{cases} 0, & \text{if } k >= \frac{\pi}{2} \text{ and } k <= \frac{3\pi}{2} \\ 1, & \text{otherwise} \end{cases}$$

where $k = (\vec{X}_a - \vec{X}_b) \cdot \vec{N}_a$.

Substituting form factor and visibility terms into Equation (6), the following expression for first bounce radiosity is:

$$B_{first} = B_i = \rho i \cdot B_p \cdot \left( \frac{\cos\theta_j \cos\theta_t}{\pi(x_p - x_i)^2} \right) \cdot A_i \cdot V_i, \quad \forall \in \{1, N\}. \quad (8)$$

Second Bounce (LOS):

$$p \Rightarrow S_i \Rightarrow S_j \Rightarrow C$$

for $\forall i \in \{1, N\}, \forall i \in \{1, N\}, j \neq i$.

In this case, light from the illuminating source hits the diffuse wall and then gets reflected to another patch on the diffuse wall. This can be viewed as the light taking two bounces and containing only LOS scene information when it reaches the camera. Using the radiosity calculated from Equation (8) as the radiosity illuminating a second bounce patch, the expression for $B_j$ may be formulated as:

$$B_j = \rho_j B_i F_{ji} V_j \quad (9)$$

$\forall i \in \{1, N\}, \forall i \in \{1, N\}, j \neq i$.

Third Bounce:

For third bounces, there are two subcases: when the ray only interacts with LOS patches, and when the ray interacts with the NLOS patch. Each case is treated separately in the derivations.

LOS Condition $$p \Rightarrow S_i \Rightarrow S_j \Rightarrow S_k \Rightarrow C,$$

$\forall i \in \{1, N\}, \forall i \in \{1, N\}, j \neq i, \forall i \in \{1, N\}, k \neq j$.

Consider the scenario where the light after bouncing off two diffuse wall patches strikes another diffuse wall patch. This can be viewed as the light taking three bounces and containing only LOS scene information when it reaches the camera. Using the radiosity calculated from Equation (9) as the radiosity illuminating a third bounce patch, the expression for $B_k$ may be formulated as:

$$B_k = \rho_k B_j F_{kj} V_k \quad (10)$$

NLOS Condition $$p \Rightarrow S_i \Rightarrow NLOS \Rightarrow S_r \Rightarrow C,$$

In the scenario where after light after undergoing first bounce LOS reaches the NLOS scene and then bounces to a diffuse wall patch before reaching the camera, this can be viewed as three bounce NLOS light. After the first bounce, the incident radiosity is given by the condition Equation (8).

$$B_q = \rho_q B_i F_{qi} V_q \quad (11)$$

$\forall i \in \{1, N\}, \forall q \in \{1, N\}$

Using Equation (11) as the radiosity of the light reaching the diffuse wall patch, the third bounce is obtained as below:

$$B_r = \rho_r B_q F_{rq} V_r, \quad (12)$$

$\forall r \in \{1, N\}$

Using Equation (8), Equation (9), Equation (10), and Equation (12), the total radiosity can be calculated as the contribution due to the NLOS radiosity and LOS radiosity as below, $$B_{total} = B_{NLOS} + B_{LOS}$$

Using these radiosity contributions, the optimization problems formulated above can then be solved. The full steps are summarized in Algorithm 1.

---

Algorithm 1
Adaptive Lighting to calculate $B_{NLOS}$

Step 1: Divide the LOS scene into N patches, calculate the surface normal and area per patch.
Step 2: Calculate light source to LOS patch light transfer.
for LOS patch i=1:N do
    Calculate the first bounce radiosity: $B_i = \rho_i B_a F_{ia}$ where $B_a$ is the
    radiosity of the illumination source.
end
Step 3: LOS patch to the NLOS object light transfer.
for LOS patch i=1:N do
    Calculate the second NLOS bounce radiosity using Equation (9) and
    using Step 2 as the radiosity emitted by each LOS patch
end
Step 4: Third bounce light from LOS to camera.
for LOS patch i=1:N do
    Calculate the final radiosity using Equation (12)
end
Step 5: Solve corresponding optimization problem (Equation 4 or
    Equation 5) using radiosities from Step 4.

---

Training and Inference Using Adaptive Lighting

The present disclosure describes the training and inference procedure for the disclosed adaptive lighting algorithm. For the dataset, the network is trained with an object contained in NLOS voxel i with the associated adaptive lighting given by the present method for the same voxel. The network is thus trained to recognize these adaptive lightings per voxel class to maximally extract NLOS information. At inference, N adaptive lightings are presented, each corresponding to an associated possible NLOS voxel where the object could be located. The final layer of the network is modified to have a softmax output to give probabilities per voxel. The present system runs all these N images through forward propagation of the network and save this softmax output of each image. The present system then takes the maximum confident probability across all N images as the location of the NLOS object.

Experimental Results

Simulated Results

In Table 1, the results for simulated data are displayed for four types of LOS walls for the localization and identification of the 4 objects. For each task, adaptive lighting is performed to select the optimal patch (m=1) to illuminate, and the 2nd and 3rd choice correspond to the subsequent patches returned by the adaptive lighting optimization. As can be determined from the table, the adaptive optimal patch had an average mean-squared error (MSE) of 2.09 cm, while the second and third chosen patches had an average MSE of 3.60 cm and 5.08 cm respectively. Thus adaptive lighting improved localization on average by 1.51 cm across all experiments. In addition, object identification was tested in the NLOS. This was a four class object identification with an additional fifth class of "No object" if the softmax score of the classifier was below 50%. Average identification of the NLOS object calculated across the four walls is 91.02% for the adaptive lighting, while the next best illuminated patch averaged 82.28%.

Network Generalization

The network generalizes across changes in camera viewpoint at testing, since data augmentation was performed during training of this nature. A camera was rotated a full 360 degrees in increments of 45 degrees at test time (for an NLOS sphere using LOS Wall 2). This incurred localization errors that varied up to 0.75 cm. Similarly, for translation of the camera position along the x,y,z axis, only variation up to 0.4 cm was observed. Thus the dataset augmentation yielded generalization to camera motion at test time.

However, the network does not generalize as well to NLOS objects it has never seen before. Using new NLOS object of the Stanford dragon (length of 6 cm, width of 3.5 cm and height of 5 cm) resulted in 8.02 cm localization error, and the Happy Buddha status (width of 5 cm and height of 15 cm) resulted in 7.18 cm localization error. It remains future research to make the networks more robust to unknown objects or simply to add enough data for the network to generalize.

Distributed Lighting

Also Table 1 presents the distributed lighting algorithm results that jointly optimizes over patch selection and illumination power (Equation 6). To compare, two baseline methods are presented: Method 1 only optimizes patch selection using the adaptive lighting algorithm and distributes power evenly among these patches, while Method 2 neither optimizes the distribution of power nor the selection of patches. The simulated experiment is for two objects (Man and Bunny) with LOS Wall 3, for two (m=2) illumination patches. Note how improvements of 40% (3.25 cm→2.17 cm average) are seen with jointly optimizing over Method 1, and as high as 65%(5.22 cm→2.17 cm average) improvement over Method 2.

Tracking and Ablation Studies

Figure 7A:
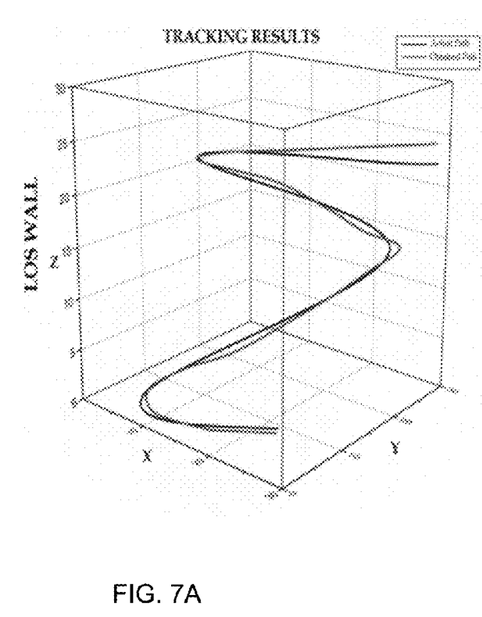
FIG. 7A shows tracking results for a sphere of diameter 5 cm for simulated data. The black trajectory denotes the actual path taken by object and red denotes the predicted position of the object.
Figure 7B:
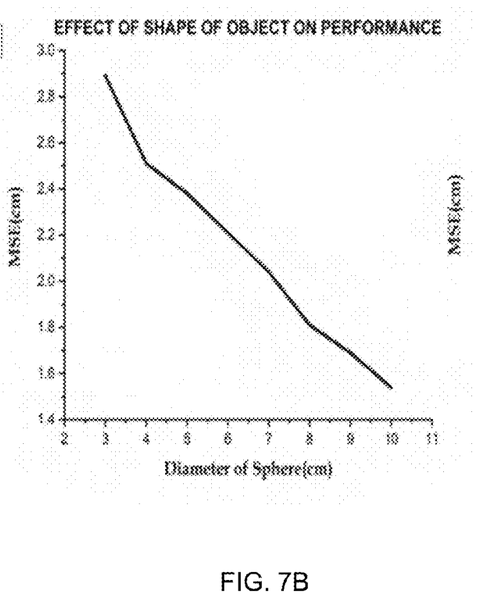
FIG. 7B shows the effect of shape of object on the MSE.

In FIG. 7A, tracking results for NLOS localization, as well as ablation studies for the effects of object size and noise are shown. FIG. 7B depicts the tracking results of a sphere, with the black trajectory denoting the ground truth and red denoting the network localization. When the sphere is within approximately 10 cm from the LOS wall (one-third of the LOS wall length), the localization error is smaller and it tends to increase progressively as the object moves farther away from the LOS wall. This is due to the loss of light due to the radiometric falloff as the NLOS object moves farther away, conforming to intuition.

Figure 7C:
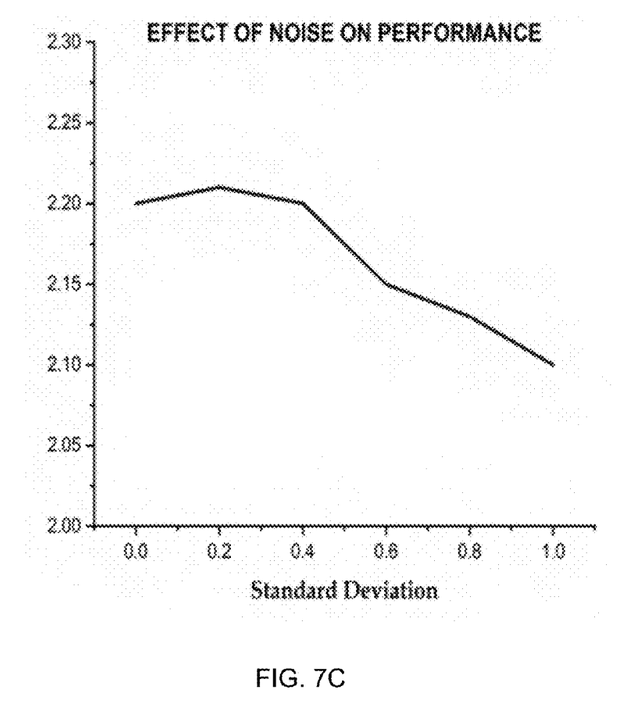
FIG. 7C shows the effect of adding noise to the dataset while training.

For object size, the diameter of a simulated sphere was varied in the NLOS, and it was observed how localization performance improves as the object gets bigger. This is intuitive since a larger object yields more reflected light back to the LOS which can be extracted by the network. Noise is usually added to make the model more robust to changes. Additionally, the effect of adding noise to the training examples is studied. In FIG. 7C, Gaussian noise was added to all training examples, and the MSE performance of the resulting network is reported. Note that the performance stays relatively flat, showing that the model is relatively robust to noise (this may be because the renderer itself has noise that helps regularize the network).

Real Experimental Results

For the hardware setup, a physical NLOS imaging prototype (35.6 cm×35.6 cm×35.6 cm dimensions) was constructed to validate the disclosed system in the real world, as shown in FIGS. 6A-6D. The LOS scene used is a variation of LOS Wall 2, and consisted of black, white, and grey colors and coarse texture given by the 3D printer. Objects were also 3D printed. Further implementation details are provided in the supplemental material.

In Table 2, the results from the real hardware prototype are presented. The adaptive lighting for a single patch resulted in an average MSE of 1.97 cm in localization, while the next best-patch had average error of 2.95 cm. The values reported in Table 2 is for a sphere (diameter of 5 cm), cylinder(radius of 3 cm and height of 8 cm), a bunny (width of 7.4 cm and height of 5 cm), and a man silhouette (width of 5.5 cm and height of 17.5 cm). For identification, similar improvements in accuracy are shown due to optimal choice of lighting (87.1%) as opposed to the next-best choice (78.3%).

For the distributed method, the method is run to optimize for two patches simultaneously in terms of location and illumination power. The adaptive algorithm achieves a MSE of 1.78 cm for the man and 2.55 cm for the bunny, 2.63 cm for the ball, and 2.41 cm for the cylinder; all of which outperform both Method 1 and Method 2. The real results help validate the idea that adaptive lighting can help improve NLOS localization and identification in a real world scene.

TABLE 1

Simulated Results for 4 different walls and 4 objects, including the performance improvement due to adaptive lighting for the optimal patch versus 2nd and 3rd patches returned by the optimization. Distributed lighting optimizes both patch selection and power distribution for m = 2 patches, while Method 1 only performs adaptive patch selection with equal distribution of power and Method 2 does not optimize either the illumination or patches.

| | | Localization with Adaptive Lighting | | | Identification with Adaptive Lighting | |
|---|---|---|---|---|---|---|
| Wall | Object | Optimal Patch | 2nd Patch | 3rd Patch | Optimal Patch | 2nd Patch |
| 1 | SPHERE | 2.19 cm | 3.26 cm | 4.89 cm | 92.6% | 81.7% |
| 1 | BUNNY | 1.89 cm | 2.54 cm | 5.93 cm | 92.8% | 82.3% |
| 1 | MAN | 1.50 cm | 2.30 cm | 3.91 cm | 93.3% | 82.1% |
| 1 | CYLINDER | 1.52 cm | 2.94 cm | 3.75 cm | 93.6% | 84.2% |
| 1 | NO OBJECT | — | — | — | 98.5% | 96.3% |
| 2 | SPHERE | 2.34 cm | 3.81 cm | 5.23 cm | 89.9% | 79.1% |
| 2 | BUNNY | 2.31 cm | 3.37 cm | 4.91 cm | 90.3% | 84.9% |
| 2 | MAN | 1.56 cm | 3.09 cm | 4.87 cm | 91.4% | 81.3% |
| 2 | CYLINDER | 1.98 cm | 3.92 cm | 4.11 cm | 91.0% | 83.5% |
| 2 | NO OBJECT | — | — | — | 98.1% | 94.6% |

TABLE 1-continued

Simulated Results for 4 different walls and 4 objects, including the performance improvement due to adaptive lighting for the optimal patch versus 2nd and 3rd patches returned by the optimization. Distributed lighting optimizes both patch selection and power distribution for m = 2 patches, while Method 1 only performs adaptive patch selection with equal distribution of power and Method 2 does not optimize either the illumination or patches.

| 3 | SPHERE | 2.90 cm | 4.9 cm | 6.15 cm | 86.4% | 76.1% |
|---|---|---|---|---|---|---|
| 3 | BUNNY | 2.81 cm | 4.17 cm | 5.85 cm | 87.8% | 78.3% |
| 3 | MAN | 1.92 cm | 3.98 cm | 5.02 cm | 88.1% | 79.2% |
| 3 | CYLINDER | 2.30 cm | 3.26 cm | 5.68 cm | 89.3% | 80.6% |
| 3 | NO OBJECT | — | — | — | 97.6% | 93.0% |
| 4 | SPHERE | 2.98 cm | 4.51 cm | 5.81 cm | 84.6% | 71.8% |
| 4 | BUNNY | 1.87 cm | 4.20 cm | 5.96 cm | 85.9% | 73.4% |
| 4 | MAN | 1.63 cm | 3.43 cm | 4.56 cm | 86.3% | 75.6% |
| 4 | CYLINDER | 1.71 cm | 3.87 cm | 4.69 cm | 87.1% | 78.3% |
| 4 | NO OBJECT | — | — | — | 95.8% | 89.3% |

Distributed Lighting

| Object | Optimal lighting using distributed lighting | Method 1 | Method 2 |
|---|---|---|---|
| MAN | 1.56 cm | 2.45 cm | 4.32 cm |
| BUNNY | 2.36 cm | 3.19 cm | 5.78 cm |

TABLE 2

Real data results using the hardware prototype for four objects trained on the complex LOS wall 2. Note that the disclosed optimization method consistently gives better localization and identification performance as compared to the next-best patch illumination.

| | Localization with Adaptive Lighting | | Identification with Adaptive Lighting | |
|---|---|---|---|---|
| Object | Optimal Patch | 2nd Patch | Optimal Patch | 2nd Patch |
| MAN | 1.55 cm | 2.41 cm | 90.1% | 81.9% |
| CYLINDER | 2.07 cm | 3.12 cm | 85.0% | 75.8% |
| BUNNY | 1.89 cm | 2.82 cm | 87.5% | 78.6% |
| BALL | 2.38 cm | 3.45 cm | 85.8% | 77.2% |

Distributed Lighting

| Object | Optimal Lighting | Method 1 | Method 2 |
|---|---|---|---|
| MAN | 1.78 cm | 2.97 cm | 5.01 cm |
| CYLINDER | 2.41 cm | 3.28 cm | 6.16 cm |
| BUNNY | 2.55 cm | 3.53 cm | 5.43 cm |
| BALL | 2.63 cm | 4.10 cm | 5.69 cm |

Energy-Efficiency of Adaptive Lighting

When a spatially-varying light pattern is used instead of a spotlight source, the illumination power is spread over the entire scene. This is counter to the stated goal of optimizing the energy-efficiency for the lighting, particularly the distributed optimization algorithm in the paper that operates under a power budget.

To illustrate the effects of loss of power that occurs when you spread the light in a spatial pattern, the following experiment was conducted.

Figure 8:
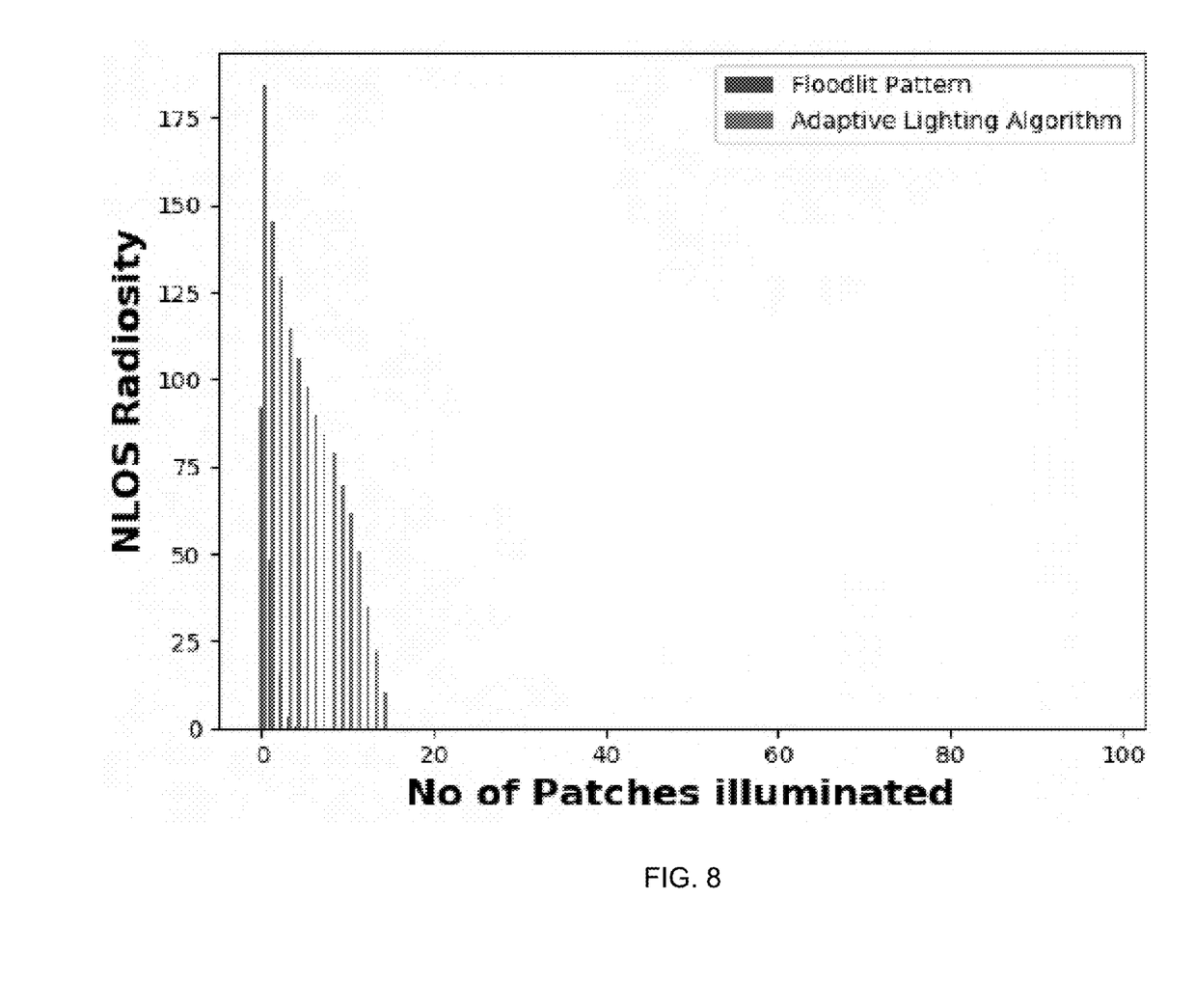
FIG. 8 plots the NLOS radiosity returned by the adaptive lighting algorithm (green) in contrast with NLOS radiosity returned by floodlighting (blue).

Consider a room with the reflective wall divided into 100 patches. The scene is illuminated for a finite number of patches, and the disclosed adaptive lighting algorithm is compared with floodlighting the scene. For floodlighting, the incident illumination power is divided by the number of patches considered, and the radiosity returned from NLOS is measured. For the present adaptive algorithm, the incident illumination power is focused onto a particular set of patches given by the optimization. In FIG. 8, it is shown that the adaptive algorithm (green) returns higher NLOS radiosity than spreading the light out in a floodlit pattern (blue). It is believed that this experiment shows the value of not using spatially-varying lighting patterns for the same energy budget.

TABLE 3

Additional real data results for four objects trained on the complex LOS wall 2.

| | Localization | |
|---|---|---|
| Object | Adaptive | Non-adaptive |
| BUNNY 1 | 2.41 cm | 3.79 cm |
| BUNNY 2 | 1.32 cm | 1.65 cm |
| BALL 1 | 2.89 cm | 4.67 cm |
| BALL 2 | 1.61 cm | 2.76 cm |

Implementation Details

For the simulated data, the CNNs are implemented using PyTorch version 0.4.1 on a single NVIDIA GeForce GTX 1080 Ti GPU. The chosen datasets are of size 100,000 images for each specific wall and 64×64 resolution. The CNN is trained using stochastic gradient descent with momentum 0.9 and learning rate $\lambda=0.0001$ for 20 epochs until convergence for classification and 16 epochs until convergence for localization, with a 70:30 training/testing split.

For the hardware prototype, a room setup was built, constructed using wood of dimension 35.6 cm×35.6 cm×35.6 cm. The walls were 3D printed and then spray-painted to be diffuse white. The real scene used for the LOS is a variation of Wall 2. The Stanford bunny, sphere and man silhouette of varying sizes were 3D printed and spray painted diffuse white to help improve signal return back to the LOS. The wall was illuminated with an InFocus IN3138HD projector. An aperture was placed after the projector of black construction paper with a small hole to focus the spot and emulate a spot light source. A Logitech C615 HD WebCam captured images of the diffuse wall. Roughly 10,000 real images were captured to use for the datasets.

Additional Real Data Localization Results

For the real data, an ablative study was also performed for localization with other sizes of spheres and bunnies. A bunny (BUNNY 1) with 5.5 cm width and 3.7 cm height was localized with MSE 2.41/3.79 cm respectively for adaptive/non-adaptive method, while a larger bunny (BUNNY 2) with 9 cm width and 7 cm height localized to 1.32/1.65 cm respectively for adaptive/non-adaptive method. A sphere (BALL 1) of diameter 3 cm localized to 2.89/4.67 cm respectively for adaptive/non-adaptive, and a larger sphere (BALL 2) of diameter 8 cm localized to 1.61/2.76 cm respectively for adaptive/non-adaptive. Note how as the size of objects gets bigger, the localization becomes more accurate in general due to more signal being reflected back from the NLOS.

Saliency

Figure 9:
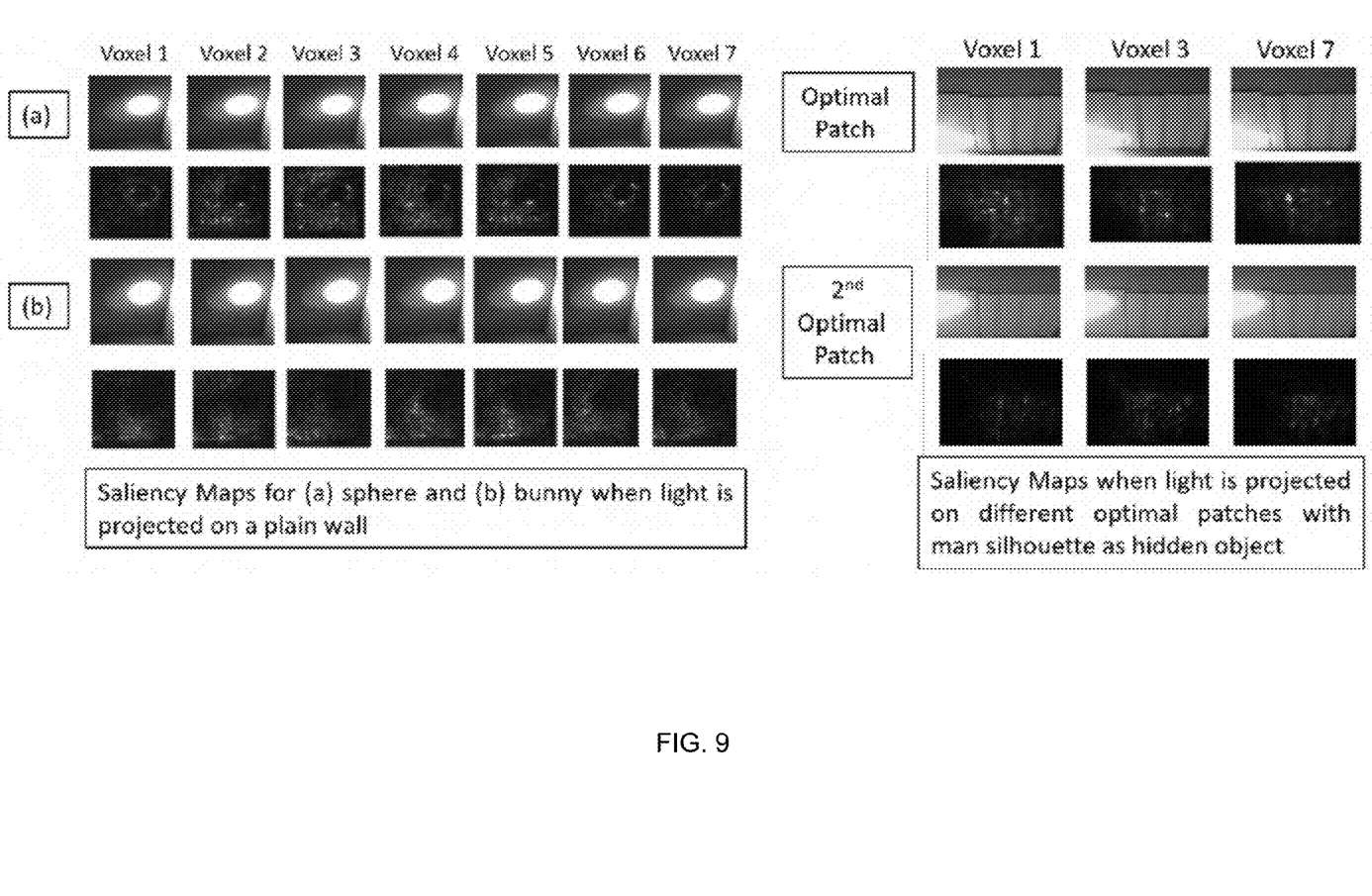
FIG. 9 shows salient image regions used by Inception network.

Saliency analysis is also performed to determine what parts of the LOS scene is salient for the NLOS localization task. To investigate what parts of the image the network is finding the most salient information, it is necessary to utilize class-saliency maps. In FIG. 9A, the input images and saliency maps are shown for the sphere and bunny projected on a planar wall. Note how the saliency of the sphere and bunny look qualitatively different, which probably explains why the network has poor generalization performance across objects it has never seen in training before. In FIG. 9B it is shown how the optimal patch returned by the adaptive lighting algorithm has more saliency for the network compared to the second best patch. This correlates with the improvement benefits seen with adaptive lighting.

Computing System

Figure 10:
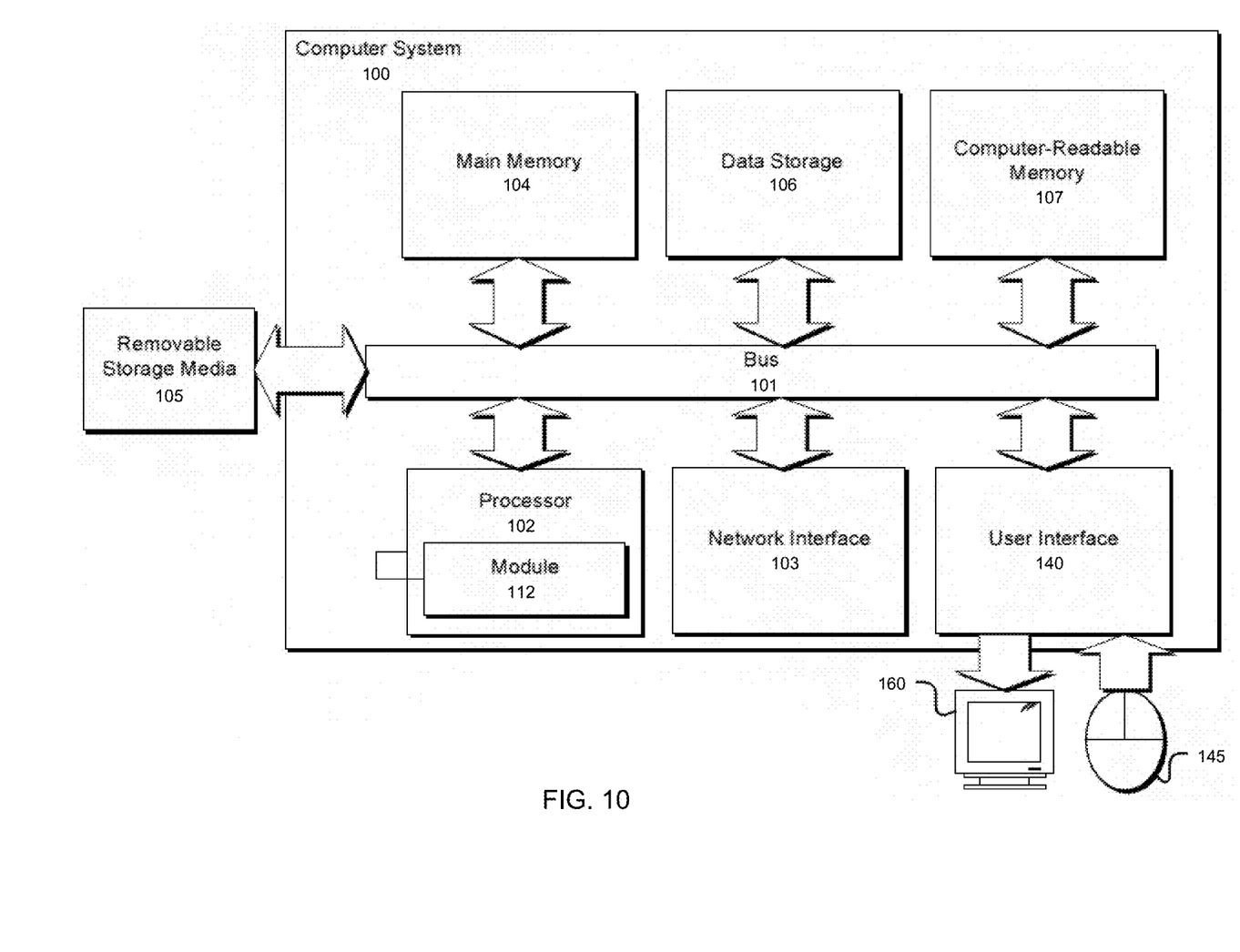
FIG. 10 is an exemplary computer system for the system and method of adaptive lighting for data-driven non-line-of-sight imaging.

FIG. 10 illustrates an example of a suitable computing system 100 used to implement various aspects of the present system and method of adaptive lighting for data-driven non-line-of-sight imaging. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 112. Such modules 112 are hardware-implemented, and thus include at least one tangible unit capable of performing certain operations and may be configured or arranged in a certain manner. For example, a hardware-implemented module 112 may comprise dedicated circuitry that is permanently configured (e.g., as a special-purpose processor, such as a field-programmable gate array (FPGA) or an application-specific integrated circuit (ASIC)) to perform certain operations. A hardware-implemented module 112 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 112 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 112 are temporarily configured (e.g., programmed), each of the hardware-implemented modules 112 need not be configured or instantiated at any one instance in time. For example, where the hardware-implemented modules 112 comprise a general-purpose processor configured using software, the general-purpose processor may be configured as respective different hardware-implemented modules 112 at different times. Software may accordingly configure a processor 102, for example, to constitute a particular hardware-implemented module at one instance of time and to constitute a different hardware-implemented module 112 at a different instance of time.

Hardware-implemented modules 112 may provide information to, and/or receive information from, other hardware-implemented modules 112. Accordingly, the described hardware-implemented modules 112 may be regarded as being communicatively coupled. Where multiple of such hardware-implemented modules 112 exist contemporaneously, communications may be achieved through signal transmission (e.g., over appropriate circuits and buses) that connect the hardware-implemented modules. In embodiments in which multiple hardware-implemented modules 112 are configured or instantiated at different times, communications between such hardware-implemented modules may be achieved, for example, through the storage and retrieval of information in memory structures to which the multiple hardware-implemented modules 112 have access. For example, one hardware-implemented module 112 may perform an operation, and may store the output of that operation in a memory device to which it is communicatively coupled. A further hardware-implemented module 112 may then, at a later time, access the memory device to retrieve and process the stored output. Hardware-implemented modules 112 may also initiate communications with input or output devices.

As illustrated, the computing system 100 may be a general purpose computing device, although it is contemplated that the computing system 100 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 102, a main memory 104 (e.g., a system memory), and a system bus 101 that couples various system components of the general purpose computing device to the processor 102. The system bus 101 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 100 may further include a variety of computer-readable media 107 that includes removable/non-removable media and volatile/nonvolatile media, but excludes transitory propagated signals. Computer-readable media 107 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 104 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 102. For example, in one embodiment, data storage 106 holds an operating system, application programs, and other program modules and program data.

Data storage 106 may also include other removable/non-removable, volatile/nonvolatile computer storage media. For example, data storage 106 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 100.

A user may enter commands and information through a user interface 140 or other input devices 145 such as a tablet, electronic digitizer, a microphone, keyboard, and/or pointing device, commonly referred to as mouse, trackball or touch pad. Other input devices 145 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 145 are often connected to the processor 102 through a user interface 140 that is coupled to the system bus 101, but may be connected by other interface and bus structures, such as a parallel port, game port or a universal serial bus (USB). A monitor 160 or other type of display device is also connected to the system bus 101 via user interface 140, such as a video interface. The monitor 160 may also be integrated with a touch-screen panel or the like.

The general purpose computing device may operate in a networked or cloud-computing environment using logical connections of a network interface 103 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device may be connected to a public and/or private network through the network interface 103. In such embodiments, a modem or other means for establishing communications over the network is connected to the system bus 101 via the network interface 103 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for identifying optimal line-of-sight lighting patches, the system comprising: a light source, wherein the light source is configured for casting an illuminated spot on a wall; a detector for capturing an image of the illuminated spot, wherein the illuminated spot undergoes at least three diffuse reflections; a processor in operative communication with the detector and configured for executing instructions including: dividing the illuminated spot illuminated on the wall by the light source into a plurality of patches, wherein the wall is within a line of sight of the detector; determining a first bounce radiosity value for each of the plurality of patches associated with a first bounce light transfer between the light source, the wall, and the detector; determining a second bounce radiosity value for each of the plurality of patches associated with a second bounce light transfer between the light source, two patches of the wall, and the detector; determining a third bounce radiosity value associated with a non-line-of-sight (NLOS) object based on the first and second bounce radiosity values, wherein the NLOS object is not within the line of sight of the detector; and identifying a set of patches of the plurality of patches which maximize radiosity associated with the NLOS object using an optimization function.

2. The system of claim 1, wherein the illuminated spot travels from the point on the wall to the NLOS object and back to the wall for detection by the detector.

3. A method for identifying optimal line-of-sight light patches, the method comprising; dividing an illumination scene illuminated on a wall by a light source into a plurality of patches; determining a total non-line-of-sight NLOS radiosity value associated with light transfer onto the wall from an NLOS object for each of the plurality of patches; determining a total line-of-sight (LOS) radiosity value associated with light transfer from the wall onto the wall for each of the plurality of patches; and identifying a set of patches which maximize radiosity associated with the NLOS object using an optimization function; wherein the optimization function maximizes radiosity associated with the NLOS object such that a sum of illumination radiant exitance values for each of the plurality of patches is equal to a total illumination power constraint value.

4. The method of claim 3, further comprising: identifying a surface normal vector and a surface area for each of the plurality of patches; determining a view factor value associated with a first patch using the surface normal vector and the surface area of the first patch and an adjacent patch for each of the plurality of patches, wherein the view factor value indicates a quantity of light which is transferred from a second patch to the first patch; and determining a visibility factor value associated with the first patch and the second patch for each of the plurality of patches, wherein the visibility factor value is zero if the first patch is not visible from the second patch and wherein the visibility factor is one if the first patch is visible from the second patch.

5. The method of claim 4, wherein a first bounce radiosity value is determined for an ith patch using a diffuse reflectance of the wall, a first radiosity of incident light directly from the light source, the view factor value, the visibility factor value, and the surface area of the ith patch.

6. The method of claim 5, wherein the first bounce radiosity value is representative of an amount of power leaving the ith patch.

7. The method of claim 5, wherein a second LOS bounce radiosity value is determined for a jth patch using a diffuse reflectance of the wall, the first bounce radiosity of the ith patch, the view factor value, the visibility factor value, and the surface area of the jth patch.

8. The method of claim 7, wherein the second LOS bounce radiosity value is representative of an amount of power leaving the second patch after being reflected from the first patch onto the second patch.

9. The method of claim 7, wherein the third LOS bounce radiosity value associated with light transfer from the object to the wall is determined for a kth patch using a diffuse reflectance of the wall, the second LOS bounce radiosity of the jth patch, the view factor value, the visibility factor value, and the surface area of the kth patch.

10. The method of claim 9, wherein the third LOS bounce radiosity value is representative of an amount of power leaving the kth patch after being reflected from the jth patch to the kth patch.

11. The method of claim 5, wherein the second NLOS bounce radiosity value is estimated using a diffuse reflectance of the object, the first bounce radiosity of the ith patch, the view factor value between the ith patch to the object, the visibility factor value, and the surface area of the object.

12. The method of claim 11, wherein the second NLOS bounce radiosity value is representative of an amount of power leaving the object after being reflected from the ith patch onto the object.

13. The method of claim 11, wherein the third NLOS bounce radiosity value associated with light transfer from the object to the wall is determined for an rth patch using a diffuse reflectance of the wall, the second NLOS bounce radiosity of the object, the view factor value, the visibility factor value, and the surface area of the ith patch.

14. The method of claim 13, wherein the third NLOS bounce radiosity value is representative of an amount of power leaving the rth patch after being reflected from the object to the rth patch.

15. The method of claim 3, wherein the illumination scene is captured by the detector.

16. The method of claim 15, wherein the detector is in operative communication with a processor such that the illumination scene captured by the detector is communicated to the processor.

17. The method of claim 3, wherein the optimization function is optimized using sequential least squares programming.

18. A system for localization and identification of non-line-of- sight objects using adaptive lighting, the system comprising: an adaptive lighting system comprising: a light source, wherein the light source is operable for illuminating an illuminated spot on a wall; and a detector for capturing an image of the illuminated spot, wherein the illuminated spot undergoes at least three diffuse: reflections; a first neural network in communication with the detector of the adaptive lighting system for determining a location of a centroid of an object; a second neural network in communication with the detector of the adaptive lighting system for identification of the object; and a processor in operative communication with the detector and operable for executing instructions including: dividing the illuminated spot illuminated on the wall by the light source into a plurality of patches, wherein the wall is within the line of sight of the detector; determining a first bounce radiosity value for each of the plurality of patches associated with a first bounce light transfer between the light source, the wall, and the detector; determining a second bounce radiosity value for each of the plurality of patches associated with a second bounce light transfer between the light source, two patches of the wall, and the detector; determining a third bounce radiosity value associated with a non-line-of-sight (NLOS) object, based on the first and second radiosity bounce values, wherein the NLOS object is not within the line of sight of the detector; and identifying a set of the plurality of patches which maximize radiosity associated with the NLOS object using an optimization function.

* * * * *